(12) United States Patent
Bantz et al.

(10) Patent No.: US 7,707,083 B2
(45) Date of Patent: Apr. 27, 2010

(54) ON-DEMAND ASSEMBLY OF BUYER SIMULACRA

(75) Inventors: David Fredrick Bantz, Portland, ME (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 10/836,045

(22) Filed: Apr. 30, 2004

(65) Prior Publication Data

US 2005/0246258 A1    Nov. 3, 2005

(51) Int. Cl.
*G06Q 40/00*    (2006.01)
(52) U.S. Cl. .......................................... 705/35; 705/36
(58) Field of Classification Search .............. 705/35–36
See application file for complete search history.

(56) References Cited

U.S. PATENT DOCUMENTS

2002/0156719 A1 * 10/2002 Finebaum et al. ............. 705/37
2004/0159700 A1 *  8/2004 Khan et al. .................. 235/380

* cited by examiner

*Primary Examiner*—Thu Thao Havan
(74) *Attorney, Agent, or Firm*—Scully, Scott, Murphy & Presser, P.C.; Louis J. Percello, Esq.

(57) ABSTRACT

Methods, systems, and computer program for interacting with simulacrum members of a buyer simulacrum. Persistent storage is configured to store collective qualifications of the simulacrum based on the individual qualifications of the simulacrum members, while a simulacrum broker is configured to present the collective qualifications to third parties. Thus, the broker provides a dynamic representation of the collective financial information, credit, insurance, trustworthiness, knowledge, skills and experience of a simulacrum or virtual buyer. The broker further enables an entity, such as a simulacrum employer or seller, to interact with the simulacrum as if that simulacrum were a single entity, rather than a collection of individual members.

14 Claims, 7 Drawing Sheets

ON-DEMAND ASSEMBLY OF BUYER SIMULACRA

FIELD OF THE INVENTION

The present invention is directed to virtual buyers also referred to as "simulacra" or "buyer simulacra", and more specifically, to arrangements for interacting with simulacra.

BACKGROUND

In today's fast-paced environment, it is often necessary for a group to purchase quickly or to form for the purposes of making a purchase. No individual or member of a group may alone have the proper buying credentials, purchasing power, expertise, time to oversee transactions, or credit. Thus, it is useful if there would be a way to create a "virtual buyer" or "buyer simulacrum" consisting of members that function as a single unit. Traditional methods are not well suited for collaboration among members of the buyer simulacrum. For example, financial credit-granting agencies and other financial institutions typically focus on individual performance, history, and credit rather than a buyer simulacrum's accomplishments. Financial credit is awarded to an individual rather than a group of people assembled on the fly, for the purpose of making purchases.

In some situations, however, it may be irrelevant to a seller, potential financial partner, or employer whether an individual or a group of individuals possess a required set of skills, credit, record of purchases, liability, and knowledge. For example, a buyer simulacrum may claim a certain amount of credit. A seller trying to sell a good or service to this buyer simulacrum may be unconcerned about how credit is divided among the buyer simulacrum members. The seller may just care that the buyer simulacrum possesses the proper credit rating or other relevant characteristics. A buyer simulacrum is often constituted of individuals with specific skills and financial characteristics such as financial credit and experience in financial deal making, some of which may be unique to the simulacrum. No single member of the simulacrum may have sufficient credit, insurance, and other relevant characteristics, yet all simulacrum members may need to contribute with both expertise and funds.

It is currently difficult to replace simulacrum members with others, in the event that a simulacrum member becomes unavailable for personal reasons, or because some higher-priority deal requires his or her attention or skills. Conventional buyer/seller environments are generally unsuited to deal with such responsibility apportionment to selected simulacrum members in a manner that reflects the collective knowledge, skills, experience, trustworthiness, financial characteristics, and funds of a buyer.

SUMMARY OF THE INVENTION

The present invention enables the effective formation of simulacra nearly instantly, and facilitates spontaneous buyer collaboration in retail sales and other environments. It addresses the above-mentioned limitations of conventional buyer/seller environments by providing a dynamic representation of the collective financial characteristics of a virtual buyer or simulacrum. Thus, one aspect of the invention provides methods, systems and apparatus for interacting with simulacrum members that compose a simulacrum. An example of a method includes a presenting operation configured to expose collective qualifications and financial information of the simulacrum based on individual qualifications and financial information of the simulacrum members. A receiving operation is configured to accept an inquiry about the simulacrum from a third party. A retrieving operation obtains simulacrum information about the simulacrum from a centralized database, and a sending operation sends an inquiry response to the third party. The inquiry response includes at least some of the simulacrum information from the centralized database.

Another aspect of the invention is the provision of a system for interacting with simulacrum members of a virtual buyer. An example of such a system includes persistent storage and a simulacrum broker. The persistent storage is configured to store collective qualifications of the simulacrum based on the individual qualifications of the buyer members. The simulacrum broker is configured to present the collective qualifications to third parties.

Yet another aspect of the invention is provision of a computer program product for interacting with simulacrum members of a simulacrum. A typical computer program includes program code to present collective qualifications of the simulacrum based on individual qualifications of the simulacrum members, receive an inquiry about the simulacrum from a third party, retrieve simulacrum information about the simulacrum from a centralized database, and send an inquiry response to the third party including at least some of the simulacrum information from the centralized database.

BRIEF DESCRIPTION OF THE DRAWINGS

The foregoing and other features, utilities and advantages of the invention will be apparent from the following more particular description of various embodiments of the invention as illustrated in the accompanying drawings, in which.

DETAILED DESCRIPTION OF THE INVENTION

Figure 1:
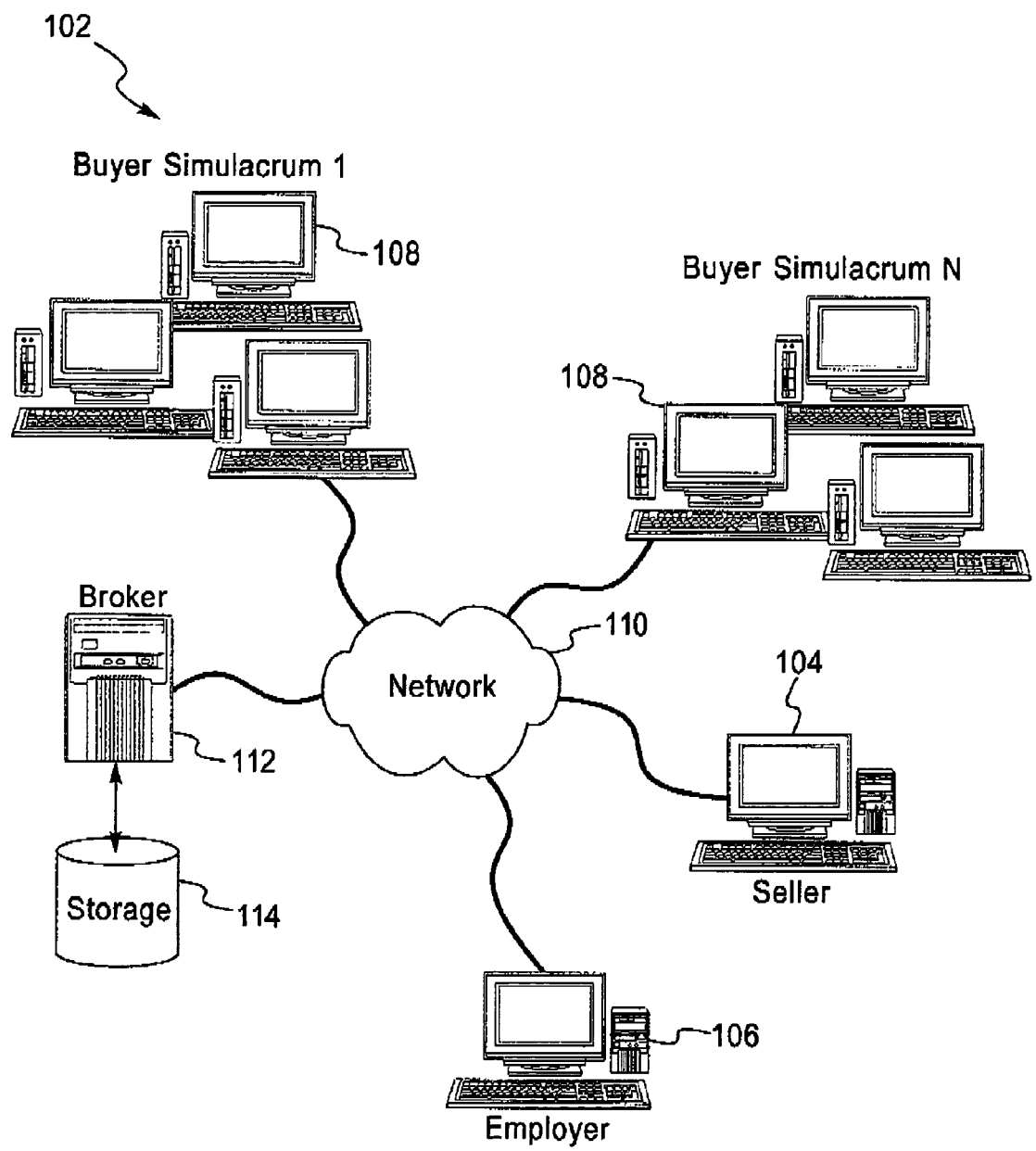
FIG. 1 shows an exemplary environment embodying the present invention.

Heretofore, when a group of individuals or groups want to form a simulacrum for the purpose of making a transaction, they used a process that is lengthy and cumbersome. The present invention enables the effective formation of such groups nearly instantly, or as quickly as desired, and facilitates spontaneous collaboration of transaction participants, e.g. a buyer, in for example retail sales and other environments.

The present invention overcomes difficulties in replacement of simulacrum members with others, in the event that a simulacrum member becomes unavailable for example, for personal reasons, or because some higher-priority deal requires his or her attention or skills. Conventional buyer/seller environments are generally unsuited to deal with such responsibility apportionment to selected simulacrum members in a manner that reflects the collective knowledge, skills, experience, trustworthiness, financial characteristics, and funds of a buyer.

It is advantageous to consider a buyer for a product or service, not as an individual or company, but rather as a buyer simulacrum or virtual buyer, whose identities may be shielded. In this way, characteristics normally associated with individuals would be used to specify characteristics of this simulacrum, e.g. credit rating, record of purchases, identity, liability, etc.

In accordance with the present invention, such buyer simulacrums are able to be assembled on-demand according to various criteria. Such a buyer simulacrum could be managed, metered, and/or charged a fee by a simulacrum service bureau, which also optionally allows simulacrum members to reach consensus about whether to purchase or how much to bid in auction situations.

The present invention addresses the above-mentioned limitations of conventional buyer/seller environments by providing a dynamic representation of the collective financial characteristics of a virtual buyer or simulacrum. The present invention enables dynamic simulacra to present an accurate assessment of their financial characteristics (e.g., credit, past deals, past purchases, insurance, credit history), demonstrated skills, accredited mastery of subject matter, and trust (e.g., neither reneging on previous deals nor sluggishly acting in financial transactions) in order to bid for and win service engagements, goods, and services automatically. Such simulacra act as a single buyer when buying from stores, auctions, and other kinds of sellers. The invention helps create a global market and facilitates inquiries about the reputation and trust of simulacra. The invention enables an entity, such as a retail seller, to interact with the simulacra as if that simulacra were a single entity, rather than a collection of individual members. It is to be noted that a given simulacrum may be composed as a collection of individual members and/or other simulacra.

An example embodiment of the present invention, provides a method for interacting with simulacrum members that compose a simulacrum. The method includes: a presenting operation configured to expose collective qualifications and financial information of the simulacrum based on individual qualifications and financial information of the simulacrum members; a receiving operation is configured to accept an inquiry about the simulacrum from a third party; a retrieving operation obtains simulacrum information about the simulacrum from a centralized database; and a sending operation sends an inquiry response to the third party. Generally, the inquiry response includes at least some of the simulacrum information from the centralized database.

The present invention also provides a system for interacting with simulacrum members of a virtual buyer. An example embodiment of the system includes persistent storage and a simulacrum broker. The persistent storage is configured to store collective qualifications of the simulacrum based on the individual qualifications of the buyer members. A simulacrum broker is configured to present the collective qualifications to third parties.

In particular embodiments of the invention, the collective qualifications may include credit information, insurance information, trust information, education information, and experience information. Furthermore, the third parties may include financial service providers, other service providers, financial partners, and what is herein referred to as a simulacrum transactor. A simulacrum transactor includes a party of interest in a transaction involving the simulacrum. This includes sellers, buyers, simulacrum employers, simulacrum members, third parties, etc. Trust information may include such items as indicators of past lawsuits, credit problems, rapidity or sluggishness with which deals are made, and any other indicators of the reliability and trustworthiness of the simulacrum.

Also provided is a computer program product for interacting with simulacrum members of a simulacrum. In an example embodiment, a computer program includes program code to: present collective qualifications of the simulacrum based on individual qualifications of the simulacrum members; receive an inquiry about the simulacrum from a third party; retrieve simulacrum information about the simulacrum from a centralized database; and send an inquiry response to the third party including at least some of the simulacrum information from the centralized database.

FIG. 1 shows an exemplary environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein.

In one configuration of the invention, the environment 102 includes a seller 104, a broker 112, and simulacra 108 coupled to a network 110. The network 110 may be any network known in the art for effecting communications between the entities in the environment 102. Thus, the network 110 can be a local area network (LAN), a wide area network (WAN), or a combination thereof. It is contemplated that the network 110 may be configured as a public network, such as the Internet, and/or a private network, and may include various topologies and protocols known in the art.

The seller 104 may be a retail store, auction, a service provider, an accrediting agency, a bank, a financially institution, a government agency, or an online store like Amazon. Com, and is selected by a simulacrum 108 through its simulacrum members. In a typical scenario, the seller 104 makes available good or services to several buyers, some of who may be physically present, while others appear as text, icons, or images on the seller's computer screen. Even a buyer who is physically present may be only a representative of the simulacrum 108. A simulacrum 108 is considered present if any simulacrum member is present. Mandatory paperwork, contracts, financial transactions, signatures, and related items are completed if any simulacrum member completes it. Surveys, contracts, questionnaires, and related items of information exchange can be handled the entire simulacrum 108, and simulacrum members are permitted to communicate among themselves during the process. The entire simulacrum may benefit from any benefits, such as may accrue for large purchases and/or frequent purchases (such as discounts, preferred-customer status, rebates, reduced shipping rates, taxes, and bonus points). If the entire simulacrum 108 attends financial transactions in person, the seller 104 can see that a group, rather than a single buyer, is part of the transaction. However, if the simulacrum 108 is not physically present but is represented by an avatar on a computer screen, the seller 104 may never know whether the transaction is being done with a single buyer or by a simulacrum 108.

The seller 104 interacts with simulacrum 108 using the network 110. The seller 104 can record and update information regarding the simulacrum's completion of transaction objectives. Thus, the seller 104 can maintain accurate and up-to-date status about simulacrum 108. This information can be subsequently transmitted to the broker 112 using the network 114 to keep the broker's records about the simulacrum 108 in complete, accurate and up-to-date status. As described in more detail below, the simulacrum 108 can negotiate financial deals more effectively through its division of responsibility for handling various aspects of the deal, which may include insurance, risk assessment, growth assessment, liability, and various specifics of the purchase such as shipping charges, taxes, obvious costs, hidden costs, rebates, discounts, and incentives for buying in bulk. Furthermore, implementation of the contemplated environment 102 generally does not require that sellers and financial institutions change their models; their models can remain that of a single entity.

In another configuration of the invention, the environment 102 includes a simulacrum employer 106 coupled to the network 110, where the simulacrum 108 provides services to the simulacrum employer 106. For example, an employer may wish to contract out for, form, or employee a buyer simulacrum for the purpose of putting a business deal together and buying a complex service from another company. As another example, the simulacrum 108 may conduct a financial audit relating to the security practices and policies for the employer 106 and then buy necessary software and services to fix potential problems. One simulacrum member may specialize in the cost of security of the employer's information technology delivery department and another simulacrum member may specialize in taxes. The simulacrum 108 is selected by the employer 106 on the basis of a resume of qualifications representing the qualifications guaranteed to be present in the simulacrum 108, not the actual qualifications of the buy simulacrum members. It is contemplated that the simulacrum employer 106 may be any entity requiring the services of the simulacrum 108, such as a potential business partner, contractor, a business, an institution, or a government agency.

When desired, buyer simulacrums may be created within seconds. This on-the-fly, that is on-demand, creation of simulacrums for the purposes of buying goods and services and/or to assist a third party, such as an employer, investor, or partner provides one advantage of this invention over conventional approaches. The third party may include a financial service provider; simulacrum employer; simulacrum partner; auditor; government; commercial institution; family member; product manufacturer; service creator; and advertiser.

The buyer simulacrum configuration of the present invention is advantageous to the simulacrum members in that contracts binding the simulacrum 108 do not restrict the activities of the individual members. Moreover, the simulacrum 108 is advantageous to the simulacrum employer 106 in that the simulacrum 108 may be reconstituted to acquire critical skills, credit, capital, financial expertise, and for specific services to target the employer's needs more precisely. The simulacrum 108 can be seen as more predictable, because it does not fail to meet deadlines if one of its members has a personal emergency or credit problem and cannot perform. The simulacrum 108 may be able to provide its services more economically because its members are free to engage in other simulacrum as soon as their responsibilities to the simulacrum 108 are discharged.

The broker 112 is configured to facilitate interactions with the simulacrum 108. For example, the employer 106 may use the services of a broker 112 to select among candidate simulacra 108 for employment. In a particular embodiment of the invention, the broker 112 may visually identify simulacra 108 on a computer screen, summarizing such simulacrum attributes as collective qualifications, credit line, duration of simulacrum activity, rate of simulacrum member flux, aggregated (collective) education level, demographics of simulacrum members, prior successes of the simulacrum, number of simulacrum members, and/or other simulacrum characteristics. The simulacrum 108 can update the broker's records to ensure that the broker 112 has complete and up-to-date information about them. The broker 112 may further include persistent storage 114 to store data pertaining to candidate buyers 108 for selection by the employer 106, as well as information about simulacrum members and perspective simulacrum members. In one embodiment of the invention, the broker 112 and simulacra 108 are implemented as Web services. Details about Web services can be found in the book *Web Services* by Ethan Cerami, O'Reilly and Associates, published February 2002, ISBN 0596002246, which is incorporated herein by reference in its entirety.

In a particular implementation of the invention, the simulacrum employer 106 first accesses the broker 116 with a simulacrum selection criteria, possibly including, but not limited to, cost, schedule, experience, trustworthiness, insurance, financial credit line, service guarantees, geographic locality, professional accreditation, skills, language fluency, and the like. Experience may include such variables as the number of years members of the simulacrum have been together, how well members or the simulacrum have done in past financial deals, expertise in particular fields and dates of training, and so forth. It may be beneficial for an individual buyer to have insurance in case a financial transaction has legal or financial risks. It may be beneficial for an individual buyer in the simulacrum to have skills, such as accounting, legal, or marketing skills, in cases in which a financial transaction is complex, has tax implications, or represents a transaction that the employer, seller, and buyer simulacrum have a stake in.

The broker 112 returns a list of simulacra that satisfy the supplied criteria to the employer. The employer 106 may also furnish a function or procedure by which a "best" score can be computed given the degree to which each simulacra satisfies the given criteria. For example, the employer 106 may specify that lower hourly rate simulacra 108 are preferred. If such a function or procedure is supplied to the broker 112, then broker 112 can return an ordered list to the employer 106 (i.e., simulacra listed in order of incrementing hourly rate). Otherwise, the employer 106 may use such evaluation criteria as normally used to select among the candidate simulacra. Thus, the broker 112 supplies accurate and current information to the employer 106 concerning the simulacra 108. In a similar manner, the broker 112 can record and update information kept for a simulacrum 108 regarding its completion of buying objectives. A seller 104 can maintain accurate and up-to-date status about the simulacrum 108. This information can then be transmitted to the broker 112 to keep the broker's records in complete, accurate and up-to-date status.

It should be appreciated that the knowledge, financial credit, and other financial characteristics represented by a given simulacrum 108 is highly dynamic, both because the simulacrum 108 become more experienced as it buys goods and services and also because simulacrum members may be shared with other simulacra and are learning and pooling financial resources through those simulacra. The present invention beneficially offers a system to represent simulacra knowledge, experience, credit and other financial resources accurately and currently to employers 106 and sellers 104. An on-line seller may be willing to sell a $50,000 computer to a simulacra with sufficient standing than it would be to any one member of the simulacra. Simulacra may also bid in auctions and receive proper standing due to their collective credit and history of trust. The invention includes a representation for the simulacrum's knowledge/experience/finances/trust as a whole and a representation of each simulacrum member's financial and knowledge characteristics. Both representations are updated when some measurable change in characteristics is achieved. For example, the financial representation is updated when a given purchase is paid for or a deal or contract signed. In this way, an accurate and current representation of the collective experience and financial characteristics of the simulacrum 108 is always available, both to current employers 106 and sellers 104 and to prospective employers and sellers.

The broker 112 may be configured to bill entities based on access to simulacrum information. For example, the broker 112 may be configured as a service provider for interacting with simulacrum members on a per-use basis, a flat fee basis, or a percentage of an employment contract. The broker 112 may bill the simulacrum members, seller 104 and/or employer 106 for its services. The broker 112 may also be configured to bill unrelated third parties for information access. For instance, the broker 112 may charge advertisers fees for information that can help target their advertisements to particular audiences. A third party may be billed based on access to the simulacrum information; access to the simulacrum information; simulacrum properties, simulacrum size, simulacrum duration, and a nature of the transaction.

At this point, the concept of a buyer simulacrum 108 is discussed in more detail. A simulacrum is defined as a group of simulacrum (i.e. buyer) members with a common objective or goal. For example, the simulacrum members may be a group of students with the objective of buying a car offered on-line by a car seller 104. In another example, the simulacrum members may be arranged to supply purchasing services to the simulacrum employer 106 or to collaborate with a potential partner. Simulacrum members may further include, but are not limited to, listening devices, recording devices, computer software agents, companies, communities, towns, states, simulacra and the like. Decisions about the constitution of the simulacrum 108 and the division of responsibility, liability, and payments within the simulacrum 108 need not be the concern of either the simulacrum's employer 106 or seller 104. The simulacrum 108 may represent its capabilities in a single resume that lists the financial and trust characteristics of the simulacrum 108 as a whole.

The buyer simulacrum 108 may enter into a contract to provide services. Furthermore, the simulacrum 108 is free to release one or more of its members from the need to work to satisfy a contract if the skills or financial and trust characteristics of that member are not required for that contract. The simulacrum 108 may represent itself as having acquired education credits and financial credits for certain buying areas, even though no single member of the simulacrum possesses such credit. Thus, the simulacrum 108 is virtualized in that for all intents and purposes it is represented as a single entity, and the exact composition of that entity can vary over time.

The members of a buyer simulacrum 108 may also be simulacra rather than simply individuals. In other words, some or all of the members of the simulacrum can be other simulacra. This hierarchical buying simulacrum structure permits substitution within a role. For example, if a simulacrum 108 requires a member knowledgeable in petroleum deals and a credit line of $1 million dollars, that member may be a simulacrum of whose members have complete knowledge of the petroleum industry and sufficient credit, or whose members collectively represent the necessary knowledge or have sufficient credit The former case of redundancy of knowledge and credit among simulacrum members permits substitution, while the latter case permits the assembly of a simulacrum on-demand from individuals whose knowledge is specialized within the domain and whose credit and trust may be of a particular type and with particular characteristics.

The employer 106 to whom the simulacrum 108 provides services, or the seller 104 to the simulacrum 108, has a view of the simulacrum 108 at any instant in time. To the extent that the simulacrum 108 is constituted of visible simulacrum members, a view includes of those members that are visible to its employer 106 or seller 104. Different employers 106 or sellers 104 may have different views of the same simulacrum 108 at a given time, and a single employer 106 or seller 104 may have different views of the same simulacrum 108 at different times.

The employer 106 may be any entity that manages or interacts with the buyer simulacrum and need not be a traditional employer in the sense of a company employer. The employer may become part of the buyer simulacrum. For example, Mr. Smith may wish to buy a boat at one of the many web pages selling boats. He does not have the financial resources to do so. Nor does he have sufficient credit on his credit card. Mr. Smith may use a buyer simulacrum to purchase the boat with himself. Mr. Smith browses to the web page, selects "Purchase Items," and broker 112 assembles a buyer simulacrum composed of five entities. The boat company charges the simulacrum and receives payment for the boat from the simulacrum. Because the boat may actually be shared between Mr. Smith and the five individual buyers, it is useful for Mr. Smith to know something about their skills and other characteristics. For example, Mr. Smith may only choose a buyer simulacrum that has a skilled mechanic or is located in New Jersey. It may be beneficial for an individual buyer to have insurance in case a financial transaction has legal or financial risks. Additionally, the seller may wish to know something about the buyer simulacrum for reasons of market information or to ensure with high probability that the simulacrum will not default on monthly payments. However, the buyers may not wish the seller to know everything about them, and thus the buyer simulacrum does not need to reveal individual names of the buyers. Note that the broker may manage the tax implications of such transactions, apportioning taxes, credit liability, and other items to individual members of the simulacrum. The simulacrum may interact with the IRS or other accounting agencies as needed.

Additionally, the broker may facilitate the exchange of information from seller to buyer simulacrum. For example, a buyer wish to know if the seller is trustworthy, has any pending lawsuits against him, or has a history of slow shipments.

Figure 2:
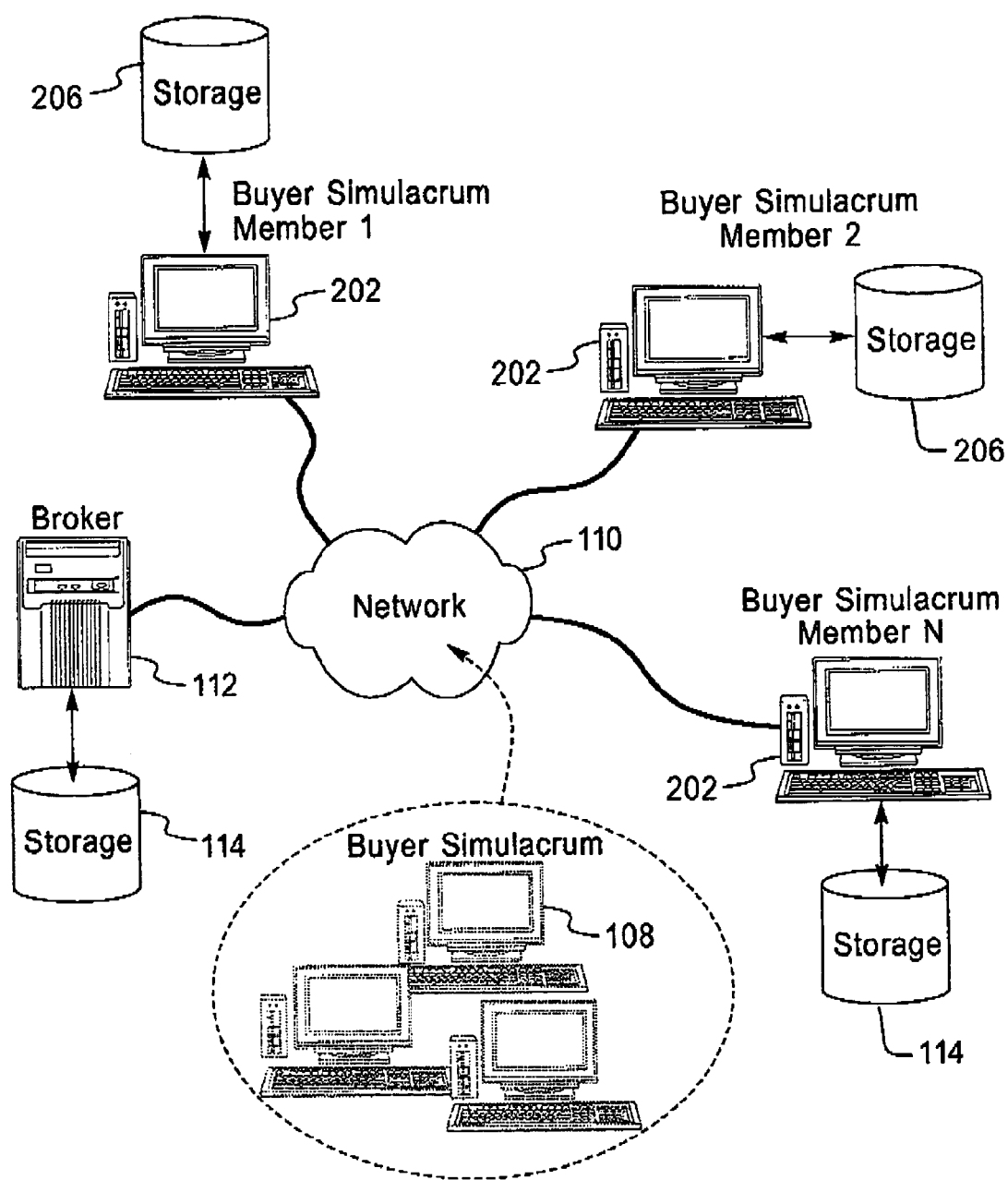
FIG. 2 shows the relationship between a simulacrum, simulacrum members, and a simulacrum broker, as contemplated by one embodiment of the invention.

With reference to FIG. 2, an exemplary relationship between a buyer simulacrum 108, its simulacrum members 202, and the broker 112 is now discussed. As previously mentioned, the simulacrum 108 exists through its simulacrum members 202 and the associations established by the broker 112. In other words, the simulacrum 208 is an abstraction or virtualization of the combination of the broker 112 and the simulacrum members 202. Although the simulacrum members 202 are shown as individual clients, it is contemplated that any simulacrum member 202 can be replaced by another simulacra 108.

Each buyer simulacrum 202 may include persistent simulacrum member storage 206. Simulacrum member storage 206 is configured to store information about the individual simulacrum member 206 and, perhaps, the buyer 108. Typically, information contained in the simulacrum member storage 206 is transferred to the broker 112 in response to requests for specific information about the simulacrum member 202. The broker 112 supports the appearance of a simulacrum 108 as a single entity, both for the purposes of financial resource pooling and experience, and service provision, and for any other purposes required. The broker 112 enables the simulacrum's employers and/or sellers, such as retail stores, to interact with the simulacrum as if the simulacrum 108 were a single entity, rather than a collection of individual members 202.

One of the values of the present invention to simulacrum employers and sellers is a simplification of the interaction with the simulacrum. The employer and seller need not be aware of the identities of the simulacrum members 202, nor any change in the simulacrum's composition. The invention is also of value to the simulacrum members 202 in that it increases each individual's range of choice as to the role, privacy, timing and extent of their participation in the simulacrum 108. The invention also reduces or eliminates the need for a simulacrum member 202 to learn more than a portion of subject matter needed to deliver a service or to risk all the individual's assets, credit, and other financial resources.

Figure 3:
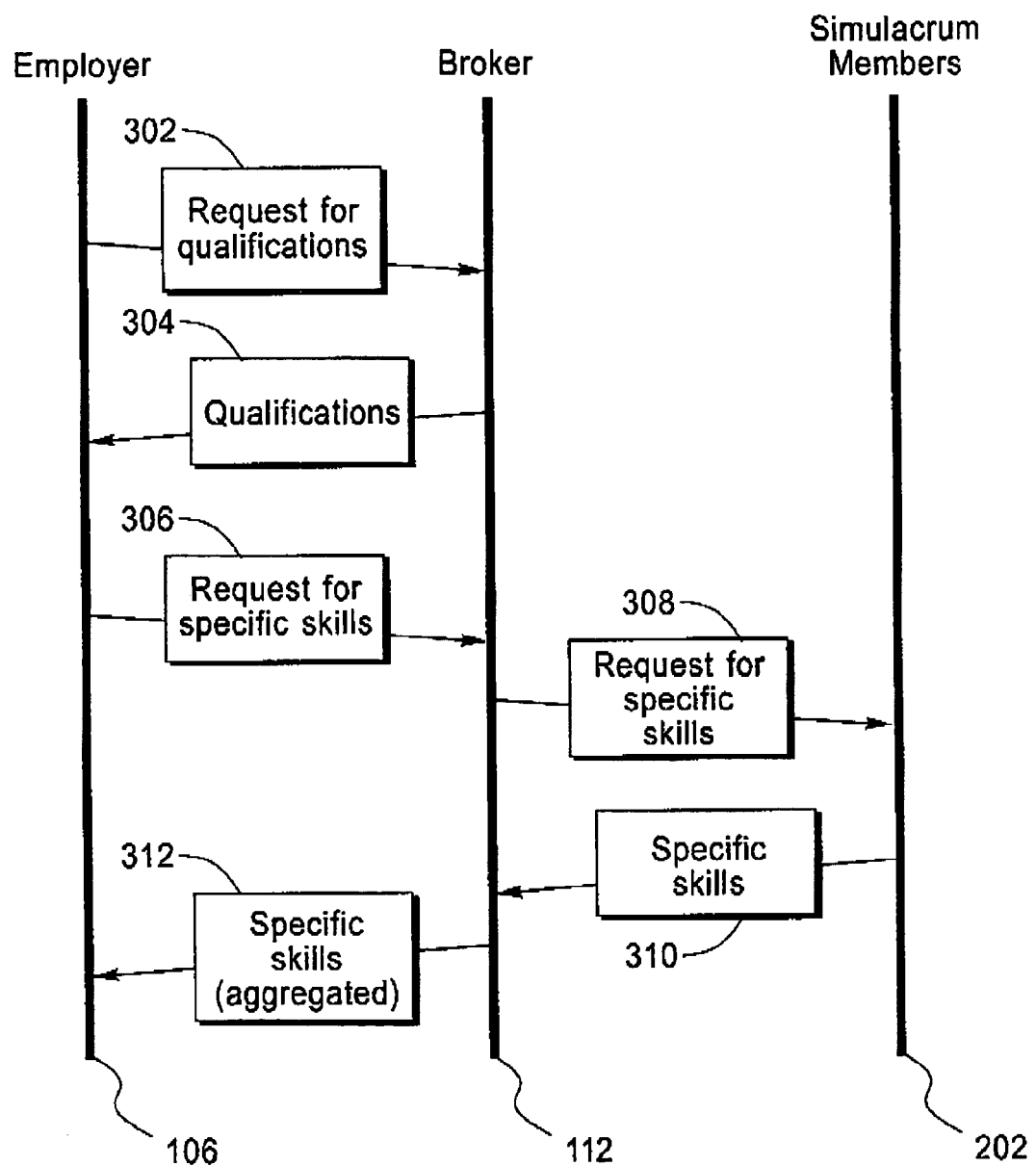
FIG. 3 shows an exemplary flow of messages between a simulacrum employer, a simulacrum broker and simulacrum members.

FIG. 3 depicts a typical flow of messages between a simulacrum employer 106, a simulacrum broker 112 and simulacrum members 202. The protocol begins with a request for qualifications message 302 from the employer 106 or seller 104 to the broker 112. "Qualifications" refer to any information relevant to a particular or potential purchase, such as financial resources, credit, credit history, assets, capital, trustworthiness, and insurance. It refers to member credit, member insurance, member history of past transactions, member skill data, member trustworthiness data, member experience data, collective credit, aggregate insurance, aggregate history of past transactions, aggregate skill data, aggregate trustworthiness data, aggregate experience data, and any combination of these qualifications.

This message 302 expresses a desire on behalf of the employer 106 to obtain the most recent and accurate qualifications of a particular simulacrum as currently constituted. In a one embodiment of the invention, the message 302 is represented as a Simple Object Access Protocol (SOAP) message, a variant of eXtensible Markup Language (XML). SOAP is described in the book "Understanding SOAP," by Kennard Scribner and Mark C. Stiver, SAMS publishing, Indianapolis Ind., 2000, which is incorporated herein by reference in its entirety. XML is described in the book "XML in a Nutshell" by Elliotte Rusty Harold and W. Scott Means, O'Reilly and Associates, 2002, which is incorporated herein by reference in its entirety.

After the request for qualifications message 302 is received by the broker 112, the broker 112 responds with a current qualifications message 304. The current qualifications message 304 includes a listing of qualification of the simulacrum as would be found generally useful to the employer 106. The employer 106 then analyzes the qualifications and, for example, determines that its particular demands require specific skills, financial assets, trustworthiness, insurance, or financial history, not addressed in the qualifications message 304. To obtain more information, the employer 106 then originates a request for specific skills, qualifications, and financial characteristics message 306 to broker 112.

The broker 112 may not maintain information sufficient to respond directly to the request for specific skills message 306. The broker 112 therefore sends a request for specific skills message 308 to the simulacrum member(s) 202. At this point, the broker or employer may have certain criteria he wishes to check to be sure that the simulacrum is appropriate. This message 308 may be a duplicate of the original request message 206 from the employer 106, or may be modified due to the broker's knowledge of the role that each member 202 plays in the simulacrum. It may therefore be the case that broker 112 must query more than one simulacrum member 202 in order to respond to the request for specific skills message 306 received from the employer 106. In such cases, the broker 112 may issue multiple requests for specific skills messages 308 to the various simulacrum members 202. Alternatively, if a reliable means is available, the message 308 may be sent to some or all of the current simulacrum members 202 using a broadcast protocol, such as that described by J. Chang and N. F. Maxemchuk in their paper "Reliable broadcast protocols," which appears in the journal *ACM Transactions on Computer Systems* vol. 2, pages 251-73 (1984), incorporated herein by reference in its entirety.

Simulacrum members 202 receiving the request message 308 respond with a specific skills message 310 to the broker 112. The broker 112 receives all of the specific skills and specific qualifications messages 310 from all the responding simulacrum members 202 and aggregates them into a single aggregated (collective) response message 312 sent to the employer 106. In this sense, the term "aggregated" refers to the collective properties of the simulacrum members. Advantageously, the broker 112 eliminates duplicate responses from multiple simulacrum members 202 in its aggregation. An aggregation may represent a summary, total, average, or sum of various member qualifications. For example, one member may have $10,000 and another $20,000 to spend, and the "aggregated response" would be the sum, or $30,000. Those skilled in the art will recognize that other interactions between employers 106, brokers 112, and simulacrum members 202 can be implemented in a manner analogous to the protocol depicted in FIG. 3.

Figure 4:
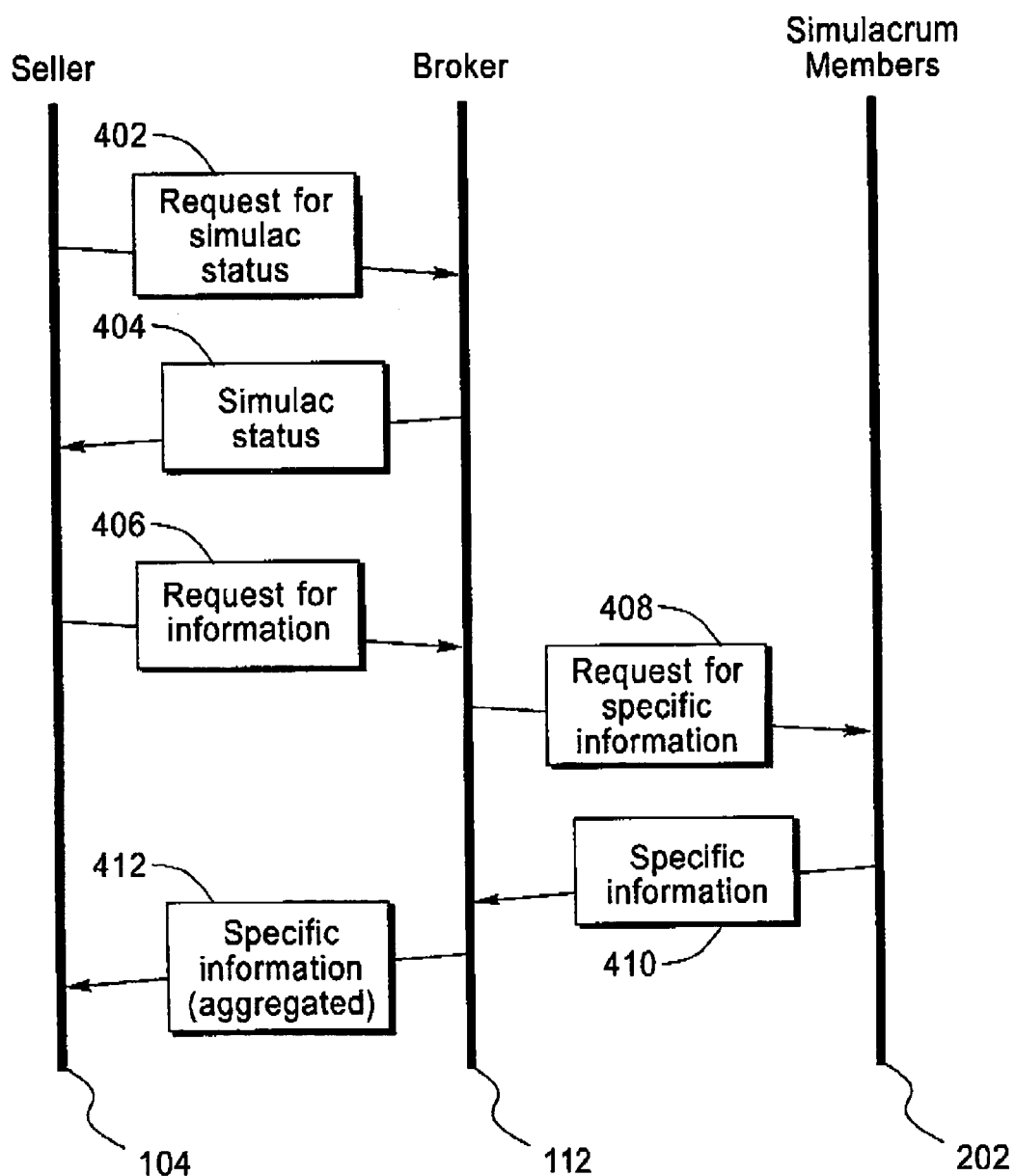
FIG. 4 shows an exemplary flow of messages between a seller, a simulacrum broker and simulacrum members.

With reference now to FIG. 4, the flow of messages between a seller 104, simulacrum broker 112 and simulacrum members 202 is shown. In such a scenario, for instance, the simulacrum may be manifested as a simulacrum and the seller 104 may be querying the status of the simulacrum. Here, the seller may be a retail store, an auction, or any supplier of goods and services. Thus, the message flow begins with a request for simulacrum status message 402 issued from the seller 104 to the broker 112. The broker 112, upon receipt of the message 402, responds with a simulacrum status message 404 that summarizes the status of the simulacrum. This message 404 could contain, for example, a the financial assets, credit rating, credit, history of credit, history of purchases, insurance, trust, and other characteristics useful in assessing whether a financial transaction should be made. The seller 104, however, may require more detailed information about the simulacrum. For example, the seller 104 may need to set up a meeting with one or more of the simulacrum members 202, or may need to review certain aspects of past purchases. The seller 104 can accomplish such tasks by issuing a request for specific information (e.g. qualifications and skills) message 406 to the broker 112. At this point, the seller may have certain criteria he wishes to check to be sure that the simulacrum is appropriate. As described previously, the broker 112 may then query each simulacrum member 202 individually by sending request for specific information messages 408 to the simulacrum members 202. The response messages 410 from the simulacrum members are received by the broker 112 and aggregated. An aggregated (collective) message 412 is then created by the broker 112 and sent to the seller 104. Those skilled in the art will recognize that other interactions between sellers 104, brokers 112, and simulacrum members 202 can be implemented in a manner analogous to the protocol depicted in FIG. 4.

Figure 5A:
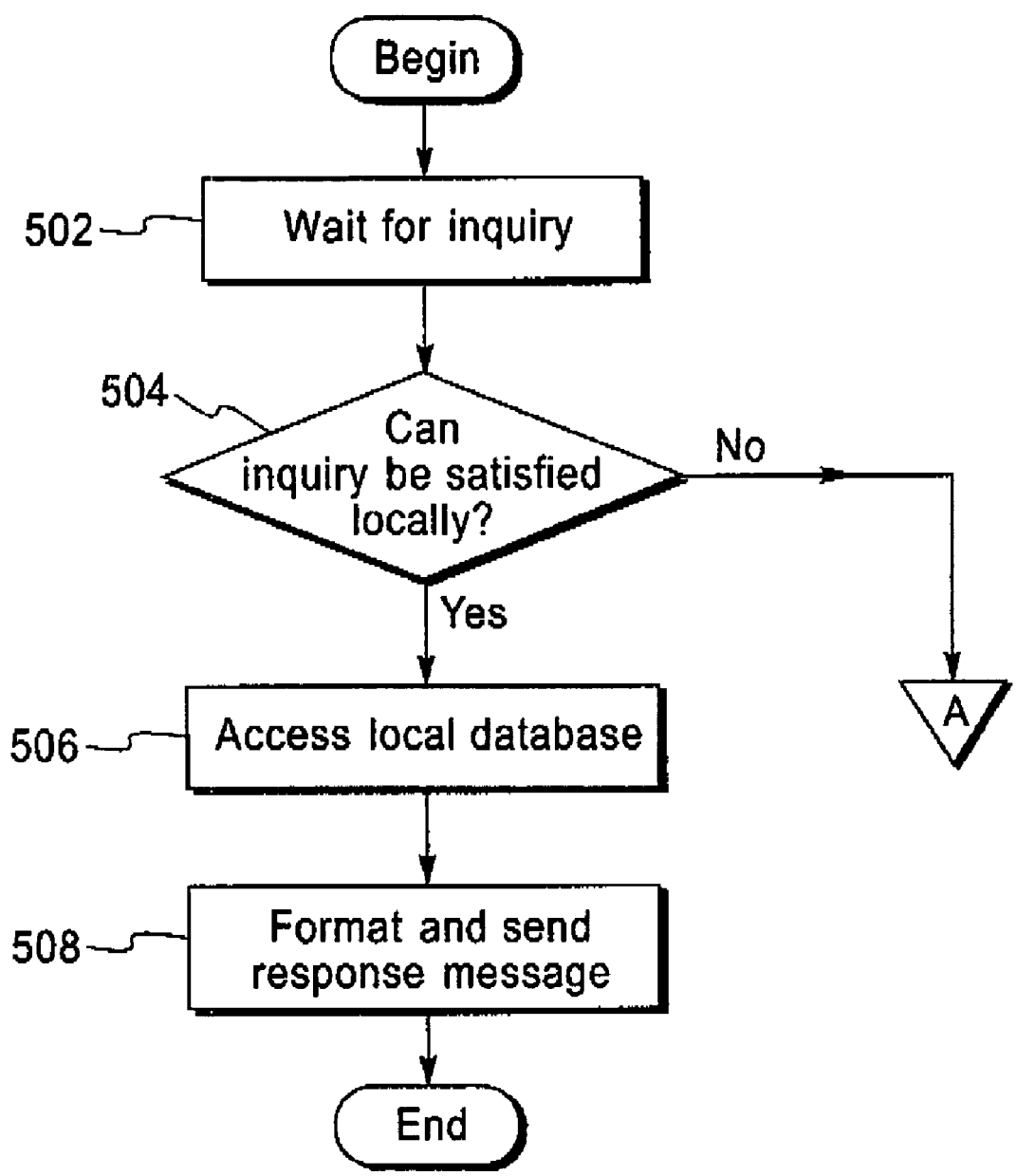
FIGS. 5A and 5B show a flowchart for processing a simulacrum response to an inquiry from a third party, as contemplated by the present invention.
Figure 5B:
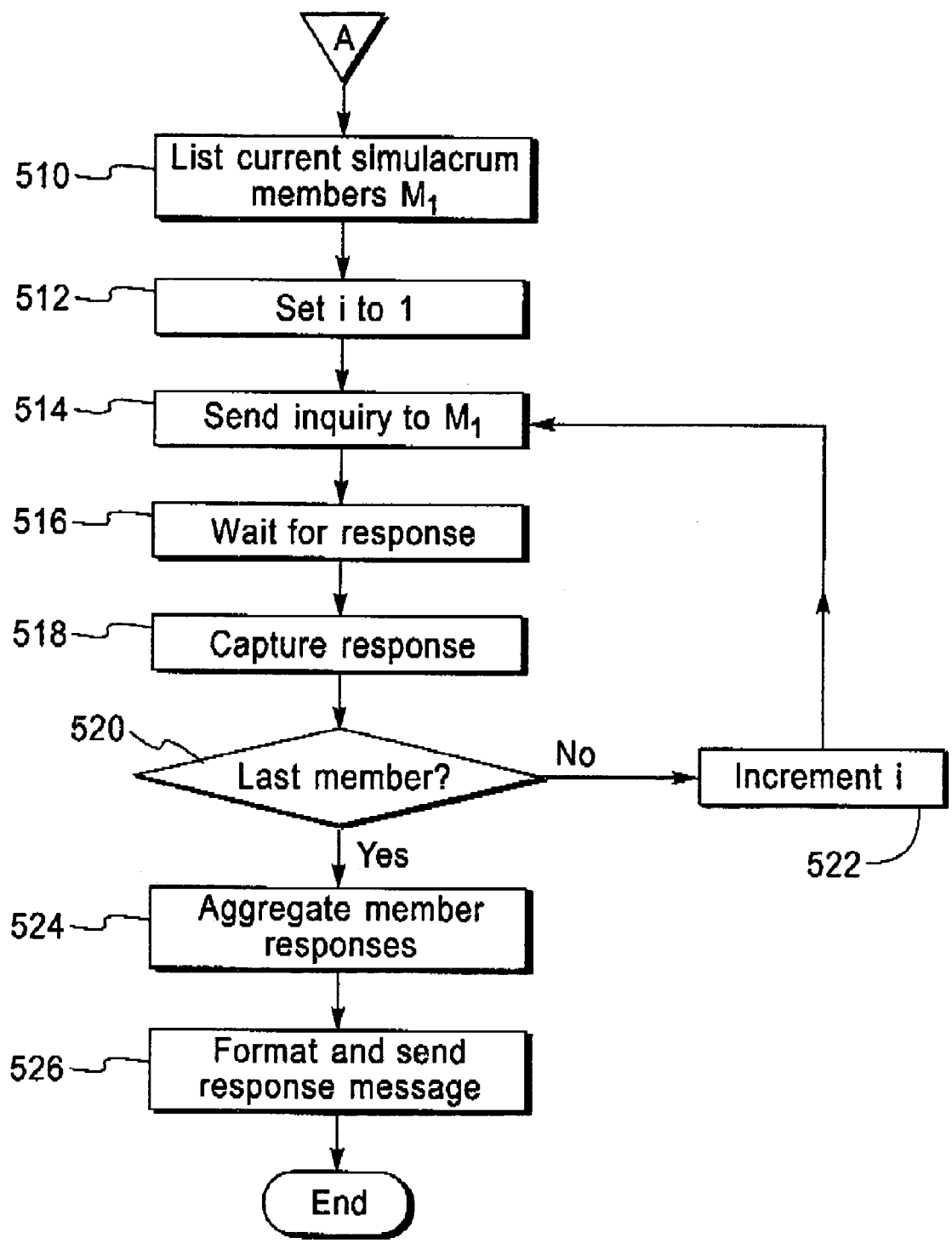

FIGS. 5A and 5B show the basic processing of the broker in response to an inquiry from either a seller or an employer, as contemplated by one embodiment of the invention. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Process flow begins at waiting operation 502. During this operation, broker waits until an inquiry is received from a third party. Once an inquiry is received, control passes to determining operation 504. At determining operation 504, the broker analyzes the inquiry to ascertain the type of inquiry received. If it is an inquiry for summary data, the inquiry can be satisfied locally and control passes to accessing operation 506. At accessing operation 506, the broker accesses a local database to obtain the desired summary information. Next, at sending operation 508, the broker formats and sends a response message to the third party.

If, at determining operation 504, the broker determines that the inquiry cannot be satisfied locally, control passes to identifying operation 510, shown in FIG. 5B. During identifying operation 510, the current simulacrum members of the virtual buyer are discovered and enumerated. Various protocols are available for this identification. For example, simulacrum members may be required to register with the broker upon joining the simulacrum and may be required to un-register when leaving it. Simulacrum members may be automatically un-registered if they are found to be unresponsive to messages as well. Alternatively, a protocol similar to a service discovery protocol (e.g., SLP) can be used to discover buyer members. SLP is documented as Internet Engineering Task Force RFCs 2165 and 2608 available from www.ietf.org, and are incorporated herein by reference in their entirety.

Once the simulacrum members are identified, control passes to initializing operation 512, where a local index i is set to 1. The local index is used in sending operation 514 to select from a list of buyer members belonging to the simulacrum. During this operation, the broker requests specific information from simulacrum members by sending inquiry messages to buyer members identified by index i. At waiting operation 516, the broker waits for a response from the simulacrum member. Once a simulacrum member response is received, control passes to capturing operation 518, where the broker stores the response. Next, at testing operation 520, the broker tests whether specific inquiries have been sent to all the simulacrum members. If more inquiries to other buyer members are required, control passes to incrementing operation 522. At incrementing operation 522, the index i is incremented to point to the next buyer member. Control then returns to sending operation 514 and the process is repeated until all the simulacrum members have returned specific information to the broker.

After the broker has received responses from all the buyer members, control passes from testing operation 520 to aggregating operation 524. At aggregating operation 524, the responses from the simulacrum members are aggregated such that redundant or unnecessary information is eliminated as appropriate. Once the simulacrum member messages are aggregated, control passes to sending operation 526. During sending operation 526, the broker formats and sends a response to the original inquirer.

Figure 6:
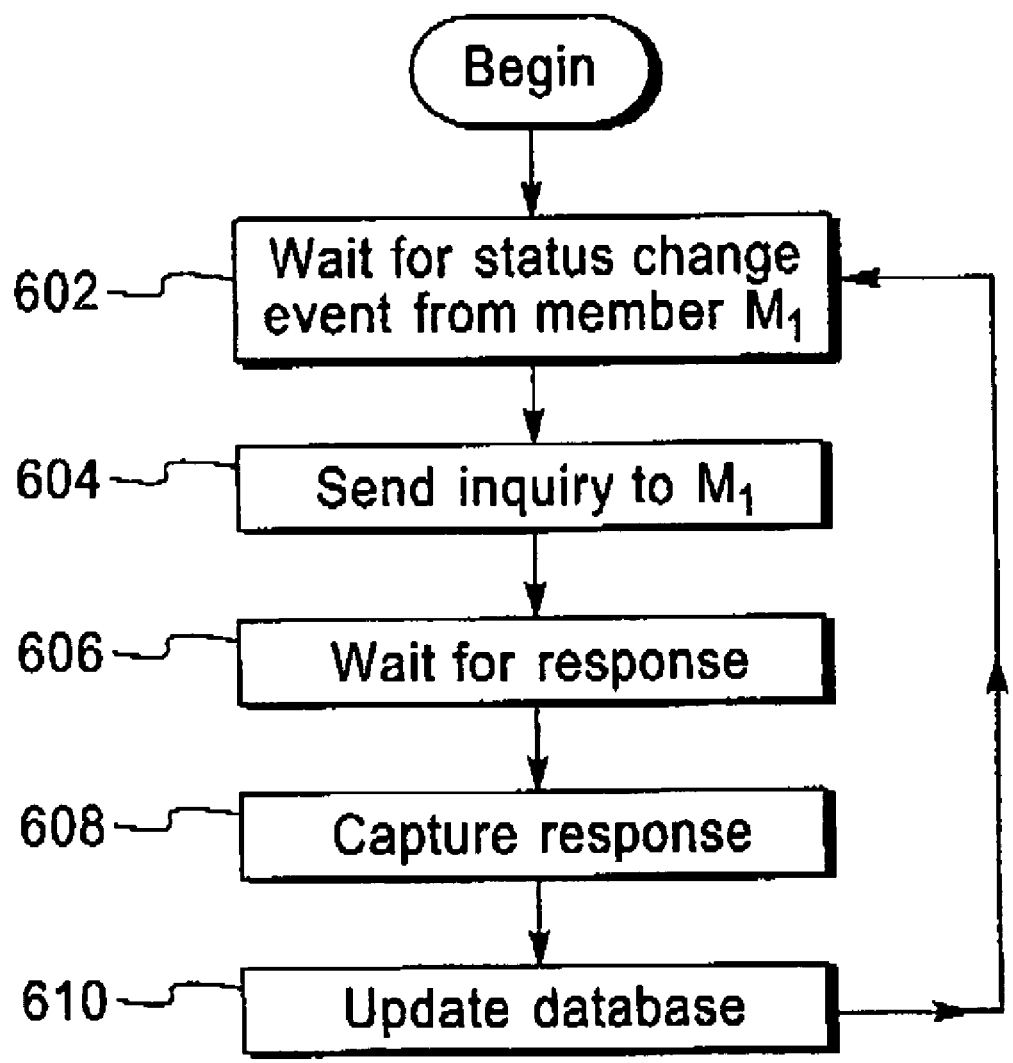
FIG. 6 shows an exemplary process for maintaining current and accurate summary information by a simulacrum about a simulacrum.

Turning now to FIG. 6, an exemplary process for a broker to maintain current and accurate summary information about the simulacrum is shown. The process starts at waiting operation 602. During waiting operation 602, the broker waits for the arrival of an event message from one of the simulacrum members indicating that there has been a change in status of that simulacrum member. In such a configuration, all simulacrum members are responsible for originating an event message if their status changes. When the event message arrives at the broker, control passes from waiting operation 602 to sending operation 604.

At sending operation 604, the simulacrum examines the event message contents, including the identification of the simulacrum member who sent the message, and sends an inquiry message to that simulacrum member. The inquiry message may be a general inquiry, or can be specific to the content of the event message. After sending the inquiry message, the broker again waits at waiting operation 606 for a response from the simulacrum member. Once a response is received by the broker, control passes to capturing operation 608, where the contents of the buyer member's response are analyzed. Next, at updating operation 610, the contents of the response message are used to update the broker's local database. After the broker's records are updated, control returns to waiting operation 602, where the broker waits for the next status change event notification from simulacrum members.

It should be appreciated that buyer simulacrums may be created within seconds from individuals, from other simulacra, and from subsets of other simulacra. This on-demand creation of simulacrums for the purposes of buying goods and services and/or to assist a third party, such as an employer, investor, or potential partner should make this invention particularly useful. Once a purchase is made, the system allows for the flow of money and other considerations between the seller, the broker, and simulacrum members, and allows components of the simulacrum to invest, pool resources, share costs, and share liability as the members see fit or as guided by the broker or simulacrum-creating system. The simulacrum also may provide privacy to the members of the simulacrum because potential sellers and employers need not know the precise identities of members of the simulacrum.

The foregoing description of the invention has been presented for purposes of illustration and description. It is not intended to be exhaustive or to limit the invention to the precise form disclosed, and other modifications and variations may be possible in light of the above teachings. It can be seen that the description given above provides a simple, but complete implementation of a buyer simulacrum. That is, embodiments have been presented allowing a third party, such as an employer, partner, or a seller, to interact with what appears to be a real entity, but is in fact a proxy for a simulacrum. The simulacrum can be composed of members, some or all of which may be simulacra. There are many kinds of inquiries to and other actions demanded of simulacra, all of which can be implemented by the methods herein disclosed.

The embodiments described herein enable many forms of simulacra. The members of these simulacra may be individuals, buyers, simulacra (virtual buyers), or computer-based service implementations. The purposes for the formation of a simulacra are various, including, but not limited to facilitating scenarios in which there are geographically-dispersed buyers and simulacra, simulacra in which membership is fluid, simulacra in which the membership overlaps with other simulacra, and the like. The simulacrum may include of members who are members of other simulacra at the same time, or members who join the buyer at different instants in time. At any given time there may be zero, one or more members of the simulacrum. If the simulacrum's workload does not demand real-time response, the simulacrum can be formed on demand—that is, the simulacrum can be formed from members joining the simulacrum after the demand for work, sales, and other business transactions is received. Thus, the embodiments disclosed were chosen and described in order to best explain the principles of the invention and its practical application to thereby enable others skilled in the art to best utilize the invention in various embodiments and various modifications as are suited to the particular use contemplated. Thus, although reference is made to performing the present invention, on-demand, or almost instantly, the concepts may be employed over any duration at the leisure of a particular invention application implementor. It is intended that the appended claims be construed to include other alternative embodiments of the invention except insofar as limited by the prior art.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system —is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for performing a transaction, said method comprising:

creating a buyer simulacrum for purchasing or providing at least one good and service, said buyer simulacrum being virtualized in that it is represented as a single entity having a composition of individuals or entities, or a combination of individuals and entities, each individual or entity having a qualification relevant to performing a particular or potential transaction involving said good or service that can vary over time;

assembling aggregate qualifications of said buyer simulacrum said qualifications comprising information relevant to a purchase or provision of said good or service, said aggregation including a representation of one or more of a total, sum or average of various qualifications of said individuals; and presenting the aggregate qualifications to a simulacrum transactor of said at least one good and service, said transactor being a party of interest in a transaction involving said simulacrum, and said simulacrum adapted to perform one or more of: investing, pooling resources, sharing costs, and sharing liability as required by said transaction involving said simulacrum, wherein a program using a computer device executes one or more of said creating, assembling, and presenting.

2. A method as recited in claim 1, further comprising said simulacrum transactor assessing at least a portion of said aggregate qualifications.

3. A method as recited in claim 1, further comprising aggregating qualifications of said simulacrum transactor.

4. A method as recited in claim 1, wherein said aggregate qualifications is a qualification taken from a group of qualifications consisting of:

member credit;
member insurance;
member history of past transactions;
member skill data;
member trustworthiness data;
member experience data;
aggregate credit;
aggregate insurance;
aggregate history of past transactions;
aggregate skill data;
aggregate trustworthiness data;
aggregate experience data; and
any combination of these qualifications.

5. A method as recited in claim 1, wherein the step of creating a buyer simulacrum comprises the steps of:

requesting qualifications from a broker, and
the broker responding with qualifications.

6. A method as in claim 5, wherein the broker is configured as a service provider for interacting with simulacrum members on a basis taken from a group of bases consisting of: a per-use basis, a flat fee basis, and a percentage of an employment contract.

7. A method as in claim 5, wherein the broker may charge advertisers fees for information that can help target their advertisements to particular audiences.

8. A method as recited in claim 1, wherein the step of creating is performed on-demand.

9. A method as recited in claim 1, wherein the step of assembling aggregate qualifications of said buyer simulacrum comprises the steps of:
sending a qualifications inquiry to members;
capturing a qualifications response from members; and
summarizing aggregate qualifications.

10. An article of manufacture comprising a computer usable medium having computer readable program code means embodied therein for causing performing of a transaction, the computer readable program code means in said article of manufacture comprising computer readable program code means for causing a computer to effect the steps of:
creating a buyer simulacrum for purchasing or providing at least one good and service, said buyer simulacrum being virtualized in that it is represented as a single entity having a composition of individuals or entities, or a combination of individuals and entities, each individual or entity having a qualification relevant to performing a particular or potential transaction involving said good or service that can vary over time;
assembling aggregate qualifications of said buyer simulacrum said qualifications comprising information relevant to a purchase or provision of said good or service, said aggregation including a representation of one or more of a total, sum or average of various qualifications of said individuals; and
presenting the aggregate qualifications to a simulacrum transactor of said of at least one good and service, said transactor being a party of interest in a transaction involving said simulacrum, and
said simulacrum adapted to perform one or more of: investing, pooling resources, sharing costs, and sharing liability as required by said transaction involving said simulacrum.

11. The method as recited in claim 1, wherein the buyer simulacrum is managed, metered and charged a fee by a simulacrum service bureau.

12. The method as recited in claim 10, wherein the buyer simulacrum is managed, metered and charged a fee by a simulacrum service bureau.

13. The method as recited in claim 1, wherein the buyer simulacrum exists for a predetermined time duration.

14. The method as recited in claim 10, wherein the buyer simulacrum exists for a predetermined time duration.

* * * * *